United States Patent [19]

Kawaguchi et al.

[11] 4,146,117
[45] Mar. 27, 1979

[54] DEVICE FOR ADJUSTING CLEARANCE BETWEEN BRAKE SHOE AND BRAKE DRUM

[75] Inventors: Hiroshi Kawaguchi; Kohji Nishikawa; Shigemi Sakakibara, all of Susono, Japan

[73] Assignee: Toyota Jidosha Kogyo Kabushiki Kaisha, Toyota, Japan

[21] Appl. No.: 828,825

[22] Filed: Aug. 29, 1977

Related U.S. Application Data

[63] Continuation of Ser. No. 696,434, Jun. 15, 1976, abandoned.

[30] Foreign Application Priority Data

Dec. 29, 1975 [JP] Japan ................................ 50-157924

[51] Int. Cl.$^2$ .............................................. F16D 65/56
[52] U.S. Cl. ........................... 188/79.5 P; 188/196 BA
[58] Field of Search ................... 188/79.5 GC, 79.5 P, 188/79.5 B, 196 BA, 198, 202, 79.5 S, 79.5 GE, 79.5 K; 192/111 A

[56] References Cited

U.S. PATENT DOCUMENTS

| 2,152,041 | 3/1939 | Goepfrich | 188/75.9 P |
| 3,338,344 | 8/1967 | Hill | 188/79.5 GC |
| 3,576,235 | 4/1971 | Bolenbaugh | 188/79.5 GC |
| 3,717,227 | 2/1973 | Rath | 188/79.5 P |
| 3,722,635 | 3/1973 | Torii et al. | 188/79.5 P |

FOREIGN PATENT DOCUMENTS 1191320  5/1970  United Kingdom ................ 188/79.5 P Primary Examiner—George E. A. Halvosa
Attorney, Agent, or Firm—Finnegan, Henderson, Farabow & Garrett

[57] ABSTRACT

In a device for adjusting the clearance between a brake shoe and a brake drum of the type having the brake shoes biased against the ends of a strut, the length of the strut being adjustable by the threaded interaction of a nut and a bolt actuated by a star wheel, the star wheel being advanced to lengthen the strut by the parking brake mechanism, a detent for restraining the reverse rotating of the star wheel. In one embodiment, a resilient arm member, fixed to a portion of the strut, acts as a detent against the teeth of the star wheel. In another embodiment, a spring, biasing the brake shoes against the ends of the strut, has a portion engaging the teeth of the star wheel.

1 Claim, 6 Drawing Figures

DEVICE FOR ADJUSTING CLEARANCE BETWEEN BRAKE SHOE AND BRAKE DRUM

This is a continuation, of application Ser. No. 696,434, filed June 15, 1976, now abandoned.

BACKGROUND OF THE INVENTION

1. Field of the Invention

This invention relates to a device for adjusting the clearance between a brake shoe and a brake drum.

2. Description of the Prior Art

Hitherto, it has been a common practice to adjust the clearance of the brake shoes and the brake drum of a motor vehicle by utilizing an adjusting lever pivoted in the brake drum for rotating a star wheel to extend a member, such as a strut of adjustable length, acting on the brake shoes. Many different methods have been proposed for operating the adjusting lever. In one of these methods, the adjusting lever is operated by means of the parking brake. In this system, a parking lever, actuated by the parking brake, pivots the adjusting lever against a bias. When the parking brake is released, the star wheel is rotated, with the resulting extension of the length of the strut. Thus, the clearance between the shoe and the drum may be maintained at an optimum value.

However, a device which adjusts the clearance of the brake shoes and brake drum by the operation of the parking brake develops a difficulty when the parking brake is operated at the same time as the main brake. In this system the brake shoes are biased against the ends of the strut by a spring, which bias acts on the sides of the star wheel to provide a normal rotational resistance. However, when the main brake is operated, the brake shoes are forced outwardly and the bias forces on the side of the star wheel are removed, allowing the star wheel to rotate with ease. On the other hand, the adjusting lever remains in engagement with the star wheel, so that the star wheel tends to rotate in either direction with the pivotal movement of the adjusting lever. In other words, the star wheel is rotated both when the parking brake is actuated and merely returns the star wheel approximately to its initial position due to the frictional engagement with the adjusting lever and the lack of substantial rotational resistance. As a result, the strut will not be extended, thus failing to effect any adjustment of the clearance between the shoe and the brake drum.

It often happens that both the foot brake and the parking brake are operated at the same time, so that the aforesaid clearance adjustment is not effected. More specifically, the parking brake is generally used when a motor has to be stopped on an upward slope, wait for a traffic signal or in parking. In such situations, a driver generally treads on the foot brake, and stops the vehicle, and then operates the parking brake, with the foot brake still in engagement.

Accordingly, the clearance between the brake shoes and the brake drum will not be adjusted. As lining wear increases with the number of braking operations, i.e. with the increase in the mileage of the vehicle, the braking ability of the vehicle is decreased. If such a case is left alone, eventual entire loss of braking may occur.

BRIEF SUMMARY OF THE INVENTION

It is accordingly a principal object of the present invention to provide a device for adjusting the clearance between the brake shoe and the brake drum, which obviates the aforesaid shortcomings, by providing means for preventing the star wheel of the brake adjusting mechanism from reverse rotation from the adjusted position.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the invention comprises an improvement in the device for adjusting the clearance between a brake shoe and a brake drum of the type in which the brake shoes are biased against the ends of a strut by a spring, the length of the strut being adjustable by the threaded interaction of a nut and a bolt, actuated by a star wheel, the star wheel being advanced to lengthen the strut by an adjusting lever pivoted in the drum, preferably on one of the brake shoes, the improvement being a mechanism engaging the star wheel for preventing the reverse rotation of the star wheel, i.e., allowing the rotation of the star wheel only in one direction.

In the preferred embodiment, the adjusting lever is actuated by the operation of the parking brake and the mechanism for preventing the reverse rotation of the star wheel comprises a resilient member having one end fixed to a portion of the strut and the other end engaging the star wheel.

In a second embodiment, a portion of the spring biasing the brake shoes against the end of the strut engages the teeth of the star wheel.

It is a feature of the invention that the star wheel can be adjusted manually without disassembling the brake drum assembly.

BRIEF DESCRIPTION OF THE DRAWINGS

The accompanying drawings, which are incorporated in and constitute a part of this specification, illustrate one embodiment of the invention and, together with the description, serve to explain the principles of the invention.

DESCRIPTION OF THE PREFERRED EMBODIMENTS

Figure 1:
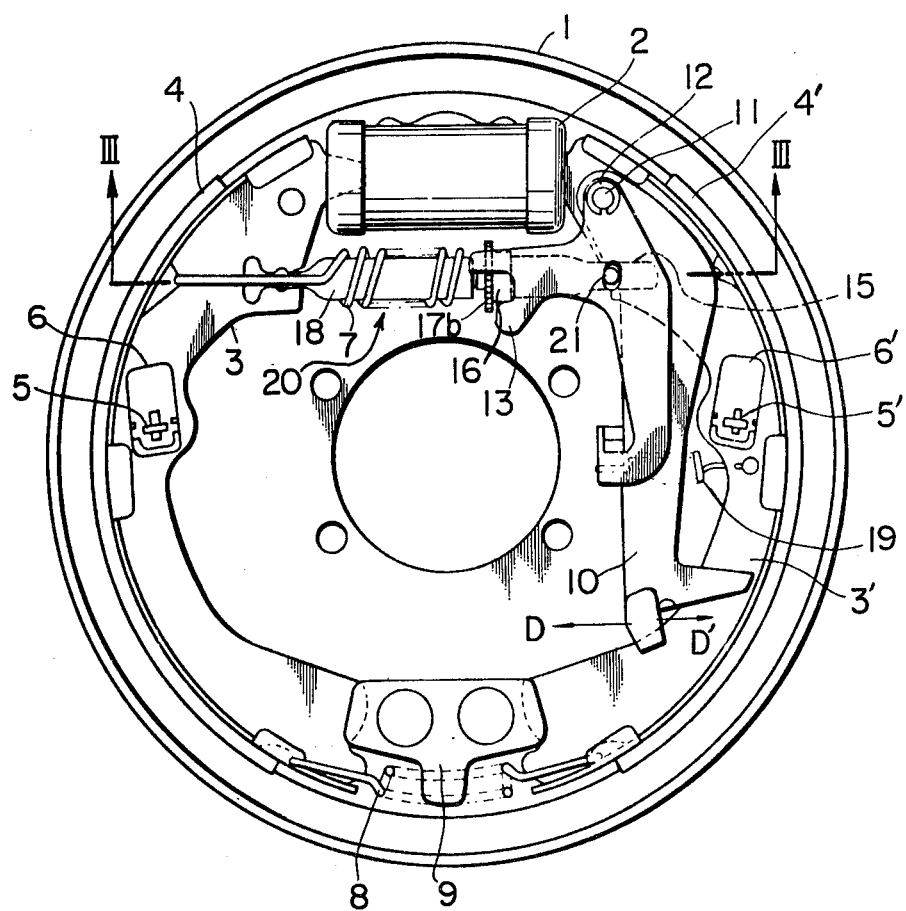
FIG. 1 is a front view of one embodiment of a drum brake assembly according to the present invention.

Reference will now be made in detail to the present preferred embodiment of the invention, an example of which is illustrated in the accompanying drawings.

Referring now to FIGS. 1 to 4, a wheel brake cylinder 2 is secured to a backing plate 1, and brake shoes 3,3' having rim surfaces faced with linings 4,4' are slidingly attached to the backing plate 1 by means of pins 5,5' and springs 6,6' as known in the art. The brake shoes 3,3' are coupled at their top ends to the wheel cylinder 2, and abut an anchor block 9 at their lower ends under the action of a spring 8. A strut 20 extends between the upper portions of the brake shoes 3,3', and return spring 7 is anchored at its opposite ends to the brake shoes 3,3' for normally biasing the brake shoes against the ends of the strut 20.

In accordance with the invention, the strut 20 includes a shoe-supporting member 15 at one end and a nut member 18 at the other end interconnected by a bolt member 17. The shoe-supporting member 15 and the nut member 18 have respective recess portions 15c, 18b, for receiving in a tight fit cut-out portions 3a' 3a of the brake shoes 3',3 under the action of the spring 7.

A threaded portion 17c of the bolt member 17 is threaded into a threaded aperture 18a in the nut member 18. The head portion 17a of the bolt member 17 is slidingly fitted in an aperture 15b of the shoe-supporting member 15. A star wheel 17b is rigidly fixed on the bolt member 17 between the shoe-supporting member 15 and the nut-member 18 and is separated from the shoe-supporting member 15 by a washer 16.

As embodied herein, the bias of the spring 7, pressing the brake shoes 3,3a against the nut member 18 and the shoe-supporting member 15, respectively, normally provides a resistance against rotation by the star wheel 17b by the friction of the washer 16 against the star wheel. However, when the brake shoes are forced apart in the actuation of the main brake the shoe-supporting member 15 slides outwardly on the head 17a of the bolt member 17 removing the frictional action on the washer 16 and the star wheel 17b, permitting the star wheel to rotate freely in either direction, if not otherwise restrained.

In accordance with the invention, an adjusting lever 13 is pivoted to the brake shoe 3' by means of a pin 11 and has a star wheel-engaging portion 13a overlying the teeth of the star wheel 17b. The portion 13a of the adjusting lever either engages the teeth of the star wheel 17b by the edge of the portion 13a, or rides on the outer edges of the teeth by the width of the portion 13a depending on the position of the lever 13a with respect to the star wheel and the amount of movement of the lever.

A return spring 19 interconnects the outer end 13b of the adjusting lever 12 with the brake shoe 13' for constantly urging the star wheel-engaging portion 13a of the adjusting lever into the teeth of the star wheel.

As embodied herein, an adjusting lever drive member in the form of a pin 21 has a portion 21c threaded into an aperture 15a in the shoe-supporting member 15. The head 21a of the pin 21 slidingly fits in an arcuate slot 13c in the adjusting lever 13.

Also rotatably supported on the brake shoe 3' by the pin 11 is a parking lever 10, actuated at the outer end 10a thereof by a parking brake member (not shown), to drive the outer end of the parking lever away from the brake shoe 3' as shown by the arrow D.

The adjusting lever 13 and the parking lever 10 are slightly spaced apart for independent action and are held on the pin 11 by the washer 12. An edge portion 10b of the parking lever 10 engages a cut-out portion of the shoe-supporting member 15 with tolerance to allow the parking lever to move in the cut-out portion (FIG. 3).

As a general result of this arrangement, the operation of the parking brake presses the edge 10b of the parking lever 10 into the cut-out portion of shoe-supporting member 15 urging the strut 20 to the left. The pin 21 carried by the member 15 engages the arcuate slot 13c in the adjusting lever 13 pivoting the lever around the pin 11 and tending to disengage the engaging portion 13a from the teeth of the star wheel 17b against the bias of the return spring 19. When the parking brake is released, the force of the return spring 19 pivots the adjusting lever in the opposite direction to advance the star wheel 17b and lengthen the strut 20.

In accordance with the invention, means have been provided for preventing the reverse rotation of the star wheel when the parking lever is pivoted by the actuation of the parking brake.

Figure 3:
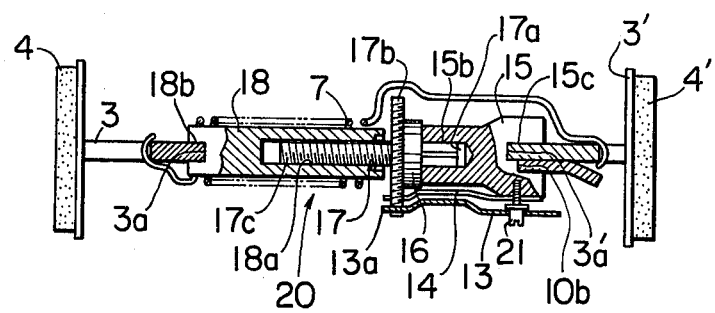
FIG. 3 is a cross sectional view taken along the line III of FIG. 1.
Figure 4:
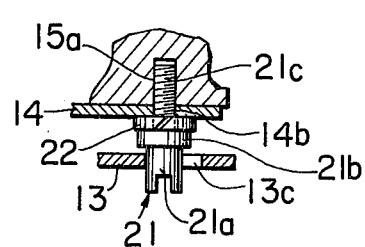
FIG. 4 is a detailed view of an adjusting-lever-drive member, as shown in FIG. 3.

In one embodiment, as shown in FIGS. 3 and 4, an elongated, resilient arm 14 is rigidly fixed to the shoe-supporting member 15 of the strut 20 by the adjusting lever driving pin 21. The pin 21 is inserted through an aperture 14b in one end of the arm 14 and a shoulder 21b on the pin 21 interacts with a spring washer 22 to fasten the arm securely. The pin 21 may have a slot, for example, in the head portion 21a for applying a tightening force. The other end of the arm 14 interacts with the teeth of the star wheel 17b to form a ratchet for preventing the reverse movement of the star wheel.

The star-wheel-reverse-rotation-preventive member 14 is located almost in alignment with the engaging portion 13a of the adjusting lever 13 but in opposite engagement with the star wheel 17b. Furthermore, the reverse-rotation-preventive member 14 may be slightly urged against the teeth of the star wheel 17b by means of a spring (not shown), thereby insuring its positive engagement with one of the teeth of the star wheel 17b.

In operation, if a foot brake (not shown) is operated, then both brake shoes 3,3' are forced in opposite directions by means of a piston (not shown) mounted in the wheel cylinder 2, so that linings 4,4' contact the inner surface of a drum (not shown), thus decelerating a motor vehicle for the eventual stoppage. At this time, the shoe 3' moves to the right carrying the pin 11 anchored thereon along with the upper ends of the adjusting lever 13 and the parking lever 10. The lower end 13b of the adjusting lever 13 also moves to the right, under the action of the return spring 19 anchored in the shoe 3'. Since the arcuate slot 13c in the adjusting lever 13 moves to the right, the lever drive pin 21 engaged therein also moves to the right, carrying with it the shoe-supporting member 15 of the strut 20. As a result, there is produced a gap between the shoe-supporting member 15 and the star wheel 17b, i.e., between the washer 16 and the star wheel 17b. Accordingly, the star wheel 17b is freed from the force being exerted on the brake shoes by the spring 7, so that the wheel 17b may rotate with ease.

At this time, if the parking brake (not shown) is operated, the lower end 10a of the parking lever 10 is pulled to the left, in the arrow direction D, whereupon the parking lever 10 is pivotally moved about the pin 11, so that the cut-out portion 10b of the parking lever 10 abuts the shoe-supporting member 15. As a result, the strut 20 will move to the left, so that the recessed portion 18b of the strut is urged against the cut-out portion 3a of the shoe 3. In this case, if the force of the parking brake urging the shoe is higher than a hydraulic pressure produced due to the operation of a foot brake, then the brake shoe 3 is forced farther to the left.

Due to the interaction of the brake shoes 3,3' and the block 9, the brake shoe 3' is also forced farther outwardly, i.e., to the right, carrying the pin 11, the adjusting lever 13 and the shoe-supporting member 15 of the strut 20.

The extent of the movements of the strut 20 and pin 11 is proportional to the extent of the movements of the brake shoes 3,3'. For this reason, when the parking lever 10 is pivoted so as to move the strut 20, the adjusting-lever-drive member 21 anchored to the shoe-supporting member 15 of the strut 20 rotates the adjusting lever 13 about the pin 11, due to the interaction of the adjusting-lever-drive-member 21 and the arcuate slot 13c in the adjusting lever 13.

Figure 2:
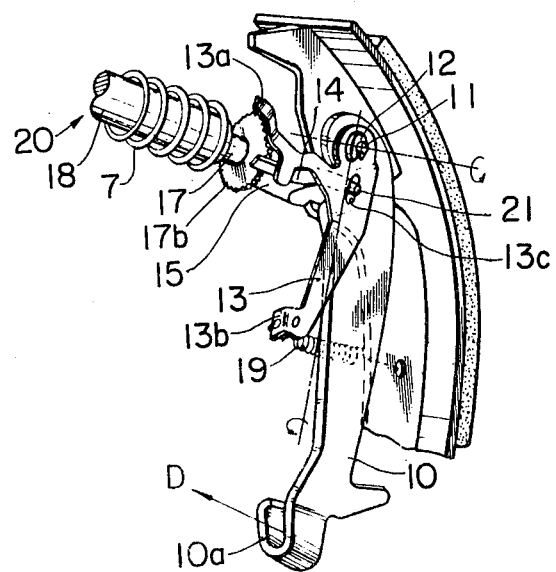
FIG. 2 is an enlarged perspective view of a portion of the embodiment of FIG. 1.

As long as a gap is maintained between the shoe-supporting member 15 and the star wheel 17b secured on the bolt member, and the star wheel is free to move, the engaging portion 13a of the adjusting lever 13, when pivoted clockwise, as seen in FIGS. 1 and 2, tends to rotate the star wheel in the direction opposite to lengthening the strut 20. However, such rotation of the star wheel 17b is prevented by means of the reverse-rotation-preventive member 14, secured to the shoe-supporting member 15 by means of the drive member 21, so that the engaging portion 13a of the adjusting lever 13 will only slide on the surface of the star wheel. Counterclockwise movements of the engaging portion 13a will, however, advance the star wheel 17b.

If the parking brake is released under the aforesaid condition, the adjusting lever 13, the parking lever 10, strut 20 and brake shoes 3,3' are returned simultaneously to their home positions under the actions of the return springs 7 and 19, so that the engaging portion 13a of the adjusting lever 13 rotates the star wheel 17b so as to extend the strut 20 and adjust the clearance between the brake shoe and the drum.

Although the force of the star-wheel-reverse-rotation-preventive member 14 being urged against the star wheel 17b results in an increase in the rotational resistance of the star wheel 17b, such resistance may be neutralized by increasing a preset load of the return spring 19. On the other hand, even if the tension of the return spring is not sufficient to return the adjusting lever 13 to its home position, when the rotational resistance of the star wheel 17b is at its maximum, upon the subsequent operation of a foot brake, the adjusting lever 13 may be rotated with ease under the tension of the return spring 19, so that the clearance between the brake shoe and the drum may be positively adjusted.

Figure 5:
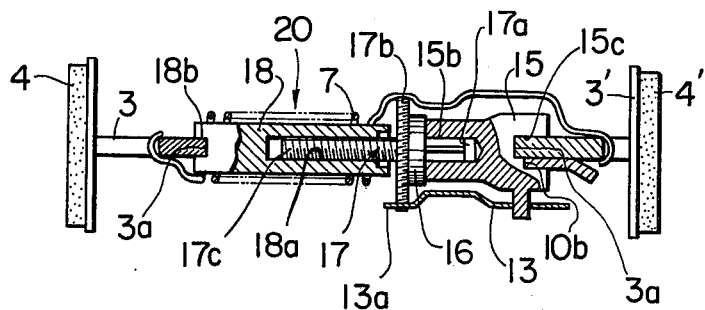
FIG. 5 is a cross sectional view of another embodiment of the present invention, similar to the view of FIG. 3 showing a brake shoe strut and a return spring.
Figure 6:
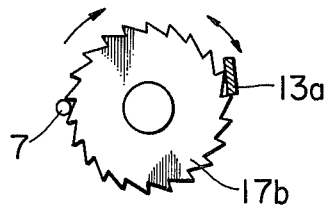
FIG. 6 is a view illustrating the condition of the adjusting lever and return spring of FIG. 5 in engagement with the star wheel.

FIGS. 5 and 6 show another embodiment of the present invention. According to this embodiment, the return spring 7, which extends substantially in parallel with the strut 20, engages the teeth of the star wheel 17b, exerting a force in the radially inward direction of the wheel 17b. As a result, the star wheel 17b may be prevented from reverse rotation, with the achievement of a desired adjustment of the clearance between the brake shoe and the drum.

As is apparent from the foregoing description of the device for adjusting the clearance between the shoe and the drum according to the present invention, even in case a driver of a motor vehicle uses a foot brake and a parking brake at the same time, the clearance between the brake shoe and brake drum may be automatically adjusted. Thus, as brake lining wear occurs during the use of the brake, with a resulting increase in the clearance between the brake shoe and the drum, desired functions of the brake may be satisfactorily retained by maintaining the brake shoe-brake-drum clearance to a optimum value at all times. Particularly, the embodiment, which utilizes the return spring as a reverse-rotation-preventive-member, provides a simple construction and hence is less expensive.

Furthermore, both of the embodiments allow manual adjustment of the clearance of the brake shoes and brake drum without dismantling the drum, by making access to the interior of the brake drum for a screw driver or a special tool through the backing plate.

While the present invention has been described by referring to a so-called leading-trailing-type brake, in which a parking brake is used for adjusting the clearance between the brake shoe and the drum, as far as the prevention of the reverse rotation of the star wheel by means of a reverse-rotation-preventive-member is utilized, devices for adjusting the clearance between the shoe and the drum fall within the scope of the present invention, irrespective of the methods for operating the adjusting lever.

What is claimed is:

1. A device for adjusting the clearance between a pair of brake shoes and a brake drum in braking apparatus comprising:

an elongated strut member having its ends normally abutting the brake shoes, the strut member including a shoe-supporting member at one end, a nut member at the other end, and a bolt member having one end slidably fitted into the shoe-supporting member and the other end threadedly engaged with the nut member, said bolt member having a star wheel rigidly fixed thereto, the rotation of said star wheel in one direction lengthening said strut member for placing the brake shoes closer to the brake drum, a return spring interconnecting said brake shoes, said spring normally biasing said brake shoes against the ends of said strut member and thereby frictionally engaging said shoe-supporting member with said star wheel in the unactivated position of said brake shoes, and said spring having a portion coiled around said nut member and a substantially straight portion engaging the sides of adjacent teeth of the star wheel for restraining the star wheel from rotation upon release of the frictional engagement during actuation of the brake shoes, an elongated pivotable adjusting lever extending substantially parallel to the axis of the star wheel and having an end portion biased into contact with the periphery of the star wheel for rotating the star wheel in said one direction by oscillation of the lever, and a parking brake lever, wherein the actuation of said parking brake lever in one direction pivots said adjusting lever against said bias for rotating said star wheel under said bias and against the restraint of said straight portion of said return spring upon the actuation of the parking lever in the other direction, and wherein said parking brake lever and said adjusting lever are both pivoted on one of said brake shoes about the same axis of rotation, said parking brake lever translating said shoe-supporting member toward said star wheel upon actuation of the parking brake lever in said one direction, and wherein said shoe-supporting member and said adjusting lever are interconnected by a pin-and-arcuate slot for pivoting said adjusting lever by actuation of the parking brake lever, the amount of adjustment of the clearance of the brake shoes being thereby a function of the extent of movement of the brake shoes in braking.

* * * * *